(12) United States Patent
Struye et al.

(10) Patent No.: US 6,583,434 B2
(45) Date of Patent: Jun. 24, 2003

(54) SYSTEM FOR DIGITAL RADIOGRAPHY AND DOSIMETRY

(75) Inventors: Luc Struye, Mortsel (BE); Paul Leblans, Kontich (BE)

(73) Assignee: Agfa-Gevaert, Mortsel (BE)

( * ) Notice: Subject to any disclaimer, the term of this patent is extended or adjusted under 35 U.S.C. 154(b) by 2 days.

(21) Appl. No.: 09/825,965

(22) Filed: Apr. 5, 2001

(65) Prior Publication Data

US 2001/0030302 A1 Oct. 18, 2001

Related U.S. Application Data

(60) Provisional application No. 60/200,730, filed on May 1, 2000.

(30) Foreign Application Priority Data

Apr. 26, 2000 (EP) ............................................ 00201518

(51) Int. Cl.⁷ .................................................. G01J 5/00
(52) U.S. Cl. ....................................... 250/581; 250/583
(58) Field of Search ................................ 250/581, 583, 250/362, 473.1, 484.4, 484.5, 485.1, 487.1, 488.1

(56) References Cited

U.S. PATENT DOCUMENTS

| | | | |
|---|---|---|---|
| 4,239,968 A | * | 12/1980 | Kotera et al. ............. 250/327.1 |
| 5,028,509 A | | 7/1991 | Shimada et al. |
| 5,066,864 A | | 11/1991 | Bradner et al. |
| 5,670,086 A | | 9/1997 | Papadopoulos et al. |
| 5,786,600 A | * | 7/1998 | Lambert et al. .......... 250/484.4 |
| 6,228,286 B1 | * | 5/2001 | Leblans et al. ........ 250/301.4 H |
| 6,271,528 B1 | * | 8/2001 | Struye et al. ............ 250/484.5 |

OTHER PUBLICATIONS

A. V. Gektin: "Scintillators and Storage Phosphors Based on $ABX_3$ Crystals", International Conference on Luminescence and Optical Spectroscopy of Condensed Matter, Osaka, Japan, Aug., 23–27 1999, vol. 87–89, pp. 1283–1285, XP002145610, Journal of Luminescence, May 2000, Elsevier, Netherlands, ISSN: 0022–2313.

* cited by examiner

*Primary Examiner*—Constantine Hannaher
*Assistant Examiner*—Otilia Gabor
(74) *Attorney, Agent, or Firm*—Breiner & Breiner, L.L.C.

(57) ABSTRACT

A radiography system is disclosed of the type having means for irradiation of an object in order to form an image of the said object or in order to detect irradiation of said object, said radiography system comprising a sensor having an exposure response function, wherein the sensor is in form of a stimulable storage phosphor plate, comprising stimulable storage phosphors, preferably having a dark-decay of more than 24 hours, wherein energy of stimulation radiation is higher than energy of emission radiation upon stimulation of said storage phosphors.

7 Claims, No Drawings

SYSTEM FOR DIGITAL RADIOGRAPHY AND DOSIMETRY

This application claims benefit of Provisional Ser. No. 60/200,730 filed May 1, 2000.

FIELD OF THE INVENTION

The present invention relates to a radiography system of the type having means for irradiation of an object in order to form an image of the said object or in order to detect irradiation of said object as a dosimetric application, wherein captured energy has to be stored for a long time.

BACKGROUND OF THE INVENTION

A well known use of phosphors is in the production of X-ray images. In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

According to another method of recording and reproducing an X-ray pattern disclosed e.g. in U.S. Pat. No. 3,859,527 a special type of phosphor is used, known as a photostimulable phosphor, which being incorporated in a panel, is exposed to incident pattern-wise modulated X-ray beam and as a result thereof temporarily stores energy contained in the X-ray radiation pattern. At some interval after the exposure, normally a beam of visible or infra-red light scans the panel in order to stimulate the release of stored energy as light that is detected and converted to sequential electrical signals which can be processed to produce a visible image. For this purpose, the phosphor should store as much as possible of the incident X-ray energy and emit as little as possible of the stored energy until stimulated by the scanning beam. This is called "digital radiography" or "computed radiography".

In the production method of high quality storage screens or panels the best results are obtained when phosphor crystals with high crystal symmetry and simple chemical composition are used. Phosphors having complicated crystal structures as, e.g., alkaline earth fluorohalides, tend to decompose (partially) under physical vapor deposition and the production of screens in this way while using phosphors with complicated crystal structure is quasi impossible and leads to sub-optimal results. The use of alkali metal halide phosphors in storage screens or panels is well known in the art of storage phosphor radiology and the high crystal symmetry of these phosphors makes it possible to provide structured screens and binderless screens.

So in e.g. U.S. Pat. No. 5,055,681 a storage phosphor screen comprising an alkali metal phosphor in a pile-like structure is disclosed. In U.S. Pat. No. 5,736,069 an alkali metal storage phosphor is disclosed corresponding to the formula:

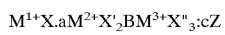

wherein: $M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 \leq c \leq 0.2$.

In EP-A 0 174 875 amongst other alkali metal stimulable phosphors a CsBr:Eu phosphor is disclosed, wherein the Eu is incorporated in the CsBr by firing CsBr with Europium oxide.

The alkali metal phosphors according to the disclosures mentioned above, make it indeed possible to produce structured screens and binderless screens.

A common characteristic of the phosphors mentioned above however is that they have a quick dark-decay, in the order of minutes up to about 1 hour. Absence of such a quick dark-decay, although permitting to read-out the phosphors with visible or infrared light as low energy sources may however lead to loss of stored energy, even at room temperature, and as a consequence such phosphor panels are not suitable for use in dosimetric applications or in applications wherein a long time has to be expected between exposure of an object which has to be examined and (digital) processing of the energy stored during said exposure. Although a quick response is normally expected, very specific applications require such a long time as set forth hereinbefore, more particularly, in security systems wherein detection of natural (or even artificial) radiation sources is desired. So, e.g., possible emission of X-rays in rocky mountains after vulcanic eruptions and detection of the direction wherein said emission proceeds, makes installation over a longer period (e.g. several months or even one year) of a storage phosphor plate in the vicinity thereof at different sites a very useful tool, wherein readout of the phosphor plates may proceed after such long time periods. A "pocket image" may also be detected in a dosimeter having a stimulable storage phosphor plate in order to get more information about the dose, but also, e.g. over the direction of undesired radiation sources: part of the detector may be covered with a grill the dimensions and size of which is perfectly known and which permits to determine the said direction from information offered by the image obtained on the said storage phosphor panel.

OBJECTS OF THE INVENTION

It is an object of the present invention to provide a radiation image storage panel, containing a storage phosphor having a slow dark-decay in order to make it suitable for use for dosimetric applications.

It is a further object of the invention to provide a method for recording and reproducing images of objects in specific applications wherein a long time is expected between exposure and read-out.

It is still a further object of the invention to provide a dosimeter detecting amounts of high energy radiation stored therein for a long time (even up to at least one month or even more)

Further objects and advantages of the invention will become clear from the detailed description hereinafter.

SUMMARY OF THE INVENTION

In order to reach the objects of the present invention a (high energy) radiography system is disclosed, wherein said system is capable to form an image of an object or to detect irradiation of the said object, said radiography system comprising a sensor having an exposure response function, wherein the said sensor is in form of a stimulable storage phosphor plate, comprising stimulable storage phosphors wherein energy of stimulation radiation is higher than energy of emission radiation upon stimulation of said stimulable storage phosphors. In a preferred embodiment for dosimetric applications said stimulable storage phosphors having a dark-decay of more than 24 hours.

Specific features for preferred embodiments of the invention are disclosed in the dependent claims.

Further advantages and embodiments of the present invention will become apparent from the following description.

DETAILED DESCRIPTION OF THE INVENTION

In this document the term "X-ray" has to be understood as any penetrating high energy radiation and includes irradiation originating from a radioisotope (e.g. $Co^{60}$, $Ir^{192}$, $Se^{75}$, etc.), radiation created by an X-ray generator of any type, radiation and high energy particles created by a high energy radiation generator (e.g. Betatron), radiation from a sample labeled with a radioisotope as is the case in e.g. autoradiography. When the term "high energy" is used, any irradiation having a shorter wavelength than energy of visible light is mentioned (thus inclusive for "ultraviolet" rays).

We have unexpectedly found now phosphors having storage properties in order to store "X-ray" energy and photostimulation properties in that photostimulation proceeds by irradiation with a wavelength shorter than the wavelength of the emitted radiation caused by said photostimulation. Until now no examples of phosphors having such characteristics have ever been shown. A particular advantage which makes those phosphors suitable for use in dosimetric applications is the slower dark-decay: photostimulation requiring a high energy (short wavelength) is indicative for the presence of a deep energy trap. When such a deep energy trap is present, then the energy in form of e.g. heat, required to clean the phosphor, is high and it is clear that at room temperature only a low amount of said energy will be lost. A slow dark-decay is an essential parameter as said energy stored in the deep trap must be present there without a remarkable decrease. Due to its insufficiently slow, too quick dark-decay BaFBr:Eu is e.g. not suitable to act as a storage phosphor in dosimetric applications.

In the system according to the present invention the sensor set forth hereinbefore is, in a preferred embodiment, in form of a stimulable storage phosphor plate, comprising stimulable storage phosphors crystallized as a cubic Perovskite structure of the Pm3m space crystallographic group (as determined by X-ray powder diffraction using Cu.alpha.1 irradiation). The "perovskite phosphors" thus used have a composition and energy storage properties which make them extremely well suitable for specific digital radiographic applications and for dosimetric applications. Laboratory experiments have demonstrated that the phosphors successfully used in the applications of the present invention are stimulable with an ultraviolet-laser in the wavelength range from 200 to 400 nm, e.g. from 266 or 355 nm.

"Perovskite" in most general terms is known as a natural mineral and as a structural type which includes no less than 150 synthetic compounds. The mineral "perovskite" is, in its idealized form $CaTiO_3$, but, as extensive substitutions occur, its structure and color ranges from yellow, brownish yellow, reddish and dark brown to black. The perovskite structure type is of particular technical interest since slight distortions away from cubic symmetry result in non-centro-symmetric, polar, arrangements which may have ferroelectric and anti-ferroelectric properties. The mineral occurs as rounded cubes modified by octahedral and dodecahedral forms.

Perovskites particularly useful in dosimetric applications and specific radiographic applications as in the system of the present invention are corresponding with following formulae (Ia–Ih):

| | |
|---|---|
| $RbCdF_3$:Mn | Ia |
| $RbMgF$:Mn | Ib |
| $CsCdF_3$:Mn | Ic |
| $NaMgF_3$:Mn | Id |
| GdOF:Mn | Ie |
| $GdBaZnO_5$:Eu | If |
| $BiOX:Eu^{3+}$ | Ig | where X is F or Cl

| | |
|---|---|
| $LiMgF_3$:Mn | Ih |

As already set forth the preferred "perovskite" type stimulable phosphors having a slow dark decay are required in the system of the present invention. A storage phosphor, having stored energy after being exposed to penetrating radiation, releases (part of) the stored energy as stimulated light upon stimulation with stimulation light, as explained above. A storage phosphor, having stored energy after being exposed to penetrating radiation, can however release said stored energy already without irradiation with stimulation light, e.g. by thermal energy, pressure etc. This latter way of releasing energy is called the "dark decay". The "dark decay" is measured by following procedure: a phosphor is irradiated by penetrating radiation of 70 kVp, and, immediately after said irradiation, stimulated by a He—Ne laser of 30 mW. The fluorescent light emitted by the phosphor upon stimulation is collected and brought to a photomultiplier (Hamamatsu R 376) giving a corresponding electrical current, proportional to the amount of emitted fluorescent light: the initial value of the amount of fluorescent light is thereby obtained. Irradiation of the phosphor with penetrating radiation is repeated, but reading of the amount of stimulable light for a given intensity of stimulating energy only takes place after keeping the irradiated phosphor in the dark for a given time. This process is repeated and the time after which the emitted fluorescent light, (and thus the energy remaining in the phosphor) of a phosphor kept in the dark, has fallen to 1/e ("e" stands for the basic number natural logarithms) is recorded as "dark decay".

A storage phosphor useful in the system of the present invention, should have a "slow" dark decay, i.a. a dark decay so that within 24 hours (and even longer, i.a. more preferably longer than 1 week, and even more preferably more than 1 month) in the dark the stimulable storage phosphors are not losing more than 5% of all stored energy. Such long times indeed are quite opposite to "quick" dark decay times in the order of only "a few hours", "minutes" or even "seconds" and it is clear that phosphors having such quick dark-decay are not suitable for use in the system of this invention.

It is preferred that the "perovskite", type crystals selected as storage phosphors in the storage panels suitable for use in the system of the present invention have a stimulation spectrum that does not interfere (or overlap) with the emission spectrum obtained upon said stimulation, wherein it is characteristic in the context of the present invention that the maximum wavelength of the stimulation spectrum is lower (more energetic stimulation) than the maximum wavelength of the emission (lower emission energy) spectrum. If however this appears there is still the possibility to make use of a suitable filter in order to avoid interference as will become clear from the Examples. The same applies when more than one emission energy band is detected. A disturbing emission band due to interference may be eliminated by filtering the undesired wavelengths. Apart from the spectrum of the stimulation and of the emission spectrum, the "excitation spectrum" is also important. The said the "excitation spectrum" is indicative for the wavelengths at which the storage phosphor can be excited while not having been exposed to ionizing radiation. The excitation spectrum is differing, particularly from the stimulation spectrum, in that the stimulation spectrum is indicative for the wavelengths at which the storage phosphor is excited after having been exposed to ionizing radiation, whereby moreover stored energy becomes released. The most comfortable situation is met when the emission spectrum is situated between the excitation spectrum and the stimulation spectrum. In a preferred embodiment the phosphor is chosen in order to fulfil the condition to have no overlap between the stimulation and the excitation spectrum and accordingly in the system of the present invention the stimulable phosphors are chosen in order to fulfil the condition to indeed have no overlap between the wavelength spectrum of stimulation and the wavelength spectrum of excitation. According to the system of the present invention said stimulable storage phosphor is thus stimulated with radiation having a wavelength that is not within the excitation spectrum. When emission wavelengths are differing in that emission of excitation is differing from the emission of stimulation, it is indeed quite easy to separate the emissions by means of an optical filter. Otherwise it is possible to have a stimulation spectrum and an excitation spectrum which are partially or completely overlapping: when however the emission spectrum of the stimulated and the excited radiation are differing the condition remains favorable in that it remains quite easy to separate both emissions by means of an optical filter.

Typical applications wherein the system according to the present invention can be used are e.g. dosimetry where the badge is only read out once a month, radiography of materials in a warm environment as e.g. furnaces, radiographic examinations in areas that are difficult to reach as e.g. expeditions and space. Also for radiographic examinations where it is important to determine exactly the exposure dose the system according to the present invention is particularly useful. Opposite thereto earlier known phosphors like BaFBr:Eu make the signal decrease in the range of 20% within one hour, which makes that phosphor unsuitable for use.

The storage phosphor used in the present invention can beneficially be used in a powder panel wherein the phosphor is applied to a support from a solution containing a binder resin and the phosphor. A phosphor screen comprising a layer containing a phosphor embedded in a binder resin is well known in the art.

In this case any binder known in the art can be used to form a screen or panel comprising a storage phosphor as the perovskite phosphor used in the present invention. Suitable binders are, e.g., gelatin, polysaccharides such as dextrin, gum Arabic, and synthetic polymers such as polyvinyl butyl, polyvinyl acetate, nitrocellulose, ethylcellulose, vinylidene chloride-vinyl chloride copolymer, polyalkyl (meth) acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. No. 2,502,529; U.S. Pat. No. 2,887,379; U.S. Pat. No. 3,617,285; U.S. Pat. No. 3,300,310; U.S. Pat. No. 3,300,311 and U.S. Pat. No. 3,743,833.

A mixture of two or more of these binders may be used, e.g., a mixture of polyethyl acrylate and cellulose acetobutyrate.

The weight ratio of phosphor to binder is generally within the range of from 50:50 to 99:1, preferably from 80:20 to 99:1. Preferably a self-supporting or supported layer of phosphor particles according to the present invention comprises said particles dispersed in a binding medium and a protective coating thereover characterized in that the binding medium substantially consists of one or more hydrogenated styrene-diene block copolymers, having a saturated rubber block, as rubbery and/or elastomeric polymers. The polymer can e.g. be represented by the formula A-B-A (tri-block) or by the formula A-B (di-block), wherein A represents styrene and B represents the hydrogenated diene block e.g. ethylene-butylene or ethylene-propylene. Further the ratio by volume of phosphor to binding medium is preferably more than 70/30 and still more preferably more than 85/15.

The phosphors of the "perovskite type" are especially well suited for manufacturing a "binderless" storage phosphor panel by physical vapor deposition. Although any method for depositing a phosphor without a binder can be used in order to apply the storage phosphor of the present invention to a support, it is preferred to use a method selected from the group consisting of physical vapor deposition, thermal vapor deposition,, chemical vapor deposition, electron beam deposition, radio frequency deposition and pulsed laser deposition. It is however not a always required to have very thin storage phosphor layers and all methods permitting crystal growth as known in the art may be applied (e.g. such as so called "method of Sochralski"). When crystals thus grown are too large (e.g. too thick) in order to be useful for certain applications, methods such as saw techniques are available in order to provide the desired dimensions for the grown-out crystals.

A "binderless" storage phosphor panel containing a perovskite phosphor can also be manufactured by depositing, by a method selected from the group consisting of physical vapor deposition, thermal vapor deposition, chemical vapor deposition, electron beam deposition, radio frequency deposition and pulsed laser deposition, the individual building-blocks leading to said perovskite phosphor.

The deposition can proceed from a single container containing a mixture of the starting compounds in the desired proportions. Thus the method encompasses further a method for manufacturing a phosphor screen containing a perovskite stimulable phosphor, comprising the steps of:

mixing said starting compounds;
bringing said mixture in condition for vapor deposition and
depositing said mixture on a substrate by a method selected from the group consisting of physical vapor deposition, thermal vapor deposition,, chemical vapor deposition, electron beam deposition, radio frequency deposition and pulsed laser deposition.

Support materials for storage screens, binderless as well as binder containing screens, containing a phosphor in accordance with the present invention, include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material.

The plastic film may contain a light-absorbing material such as carbon black or a dye, or may contain a light-reflecting material such as titanium dioxide or barium sulfate. The former is appropriate for preparing a high-resolution type storage screen, while the latter is appropriate for preparing a high-sensitivity type storage screen.

Examples of preferred supports include polyethylene terephthalate, clear or blue colored or black colored (e.g., LUMIRROR C, type X30, (trade name) supplied by Toray Industries, Tokyo, Japan), polyethylene terephthalate filled with TiO2 or with BaSO4. Metals as e.g. aluminum, bismuth and the like may be deposited e.g. by vaporization techniques to get a polyester support having radiation-reflective properties.

These supports may have a thickness which may differ depending on the material of the support, and may generally be between 60 and 1000 $\mu$m, more preferably between 80 and 500 $\mu$m from the standpoint of handling.

According to the present invention the system is one of the type having means for detecting irradiation of an object, thereby exposing a sensor, wherein the sensor is a stimulable storage phosphor plate having an exposure response function in that penetrating radiation energy captured by the sensor is stored therein and is, at predetermined intervals, coupled to be emitted by stimulation radiation impinging on the said phosphor, wherein said stimulation radiation has a wavelength shorter than 500 nm (more preferably less than 400 nm) and is generated by activating said source of stimulation light in order to cause said storage phosphor to emit an amount of fluorescent light having a longer wavelength than the wavelength of the stimulation light (or radiation) as an emitted signal proportional to said amount of stored energy and wherein said system further has control means in order to quantify emitted signal responses of the plate by the steps of reading said amount of fluorescent light and converting it in an electric signal value, storing electric signal value(s) obtained at said predetermined intervals and processing them in order to quantify total amount of radiation absorbed by said object, comparing said total amount with pre-defined threshold values for obtaining a difference value and reproducing said difference value on a display.

In one embodiment in the system according to the present invention wherein said electrical signal value is sent to a central computer for storing said electrical signal value(s), processing it in order to evaluate a total amount of radiation absorbed by said object, and comparing said total amount with a pre-defined threshold value in order to obtain a difference value and wherein said difference value is sent to a display.

In a further embodiment according to the present invention the system has as control means a microcomputer having a control function stored as a lookup table in a memory of the microcomputer. In the system according to the present invention detection of obtained difference values converted into an electrical signal value proceeds by means of a decentralized display screen or printer.

In the system according to the present invention the step of activating said source of stimulation light in order to cause the perovskite storage phosphor to emit an amount of fluorescent light in proportion to an amount of stored energy, reading said amount of fluorescent light and converting said amount of fluorescent light in an electric signal value, proceeds by means of a decentralized display screen or a printer. In another embodiment the source of stimulation light is an electroluminescent device, which is suitable for use provided that a longer time (e.g. about 10 minutes) is taken for reading out the phosphor as such an electroluminescent device is not very sensitive. The electroluminescent element can be built in the monitoring device together with the radiation absorbing device.

Further in the system according to the present invention said electric signal value is sent to a central computer for storing said electric signal value(s), processing them in order to evaluate a total amount of radiation absorbed by said object, and comparing said total amount with a pre-defined threshold value for obtaining a difference value, wherein said difference value is sent to said decentralized display.

In another embodiment according to the system of the present invention in the said system, difference values are sent to a central memory for storing it.

In still another embodiment according to the present invention said difference value is stored in an electronic memory chip on said monitoring device.

The system according to the present invention as set forth thus provides steps of storing electric signal value(s) obtained at said predetermined intervals and further provides the steps of processing them in order to evaluate a total amount of radiation absorbed by said object, and the steps of comparing said total amount with a pre-defined threshold value for obtaining a difference value, wherein this proceeds in a processor chip on said monitoring device.

A personal monitor is thus provided, wherein said monitor makes part of the system of the present invention as set forth and wherein said monitor comprises a storage phosphor panel capable to store incident radiation energy and to quantify said incident radiation. When originating from a radiation source having a wavelength of 350 nm or less, said panel is covered with an optical filter absorbing radiation having a wavelength of 350 nm or more. So a personal monitor wherein said incident radiation is substantially composed of UV-B and UV-A rays, e.g. from sunlight, in the wavelength range from 250 to 350 nm is provided as a dosimeter. Said personal monitor may further comprise a digital memory storing medium, wherein said digital memory storing medium is an EPROM, a bubble memory, a non-volatile RAM or a magnetic memory. Methods wherein detection of released energy proceeds by an optical system comprising a photomultiplier, a photodiode, a phototransistor, a gas detector, a CCD, CMOS or TFT (Thin Film Transistor), leading it to a light detector, wherein, before entering said detector, an optical filter is present absorbing stimulating radiation and transmitting fluorescent light are thus possible. Particularly when said apparatus comprises a DSP(digital signal processing)-chip an easy way to quantitatively determine energy released by the storage panel is available.

The storage phosphor plate can be erased afterwards, in order to provide multiple use, with thermal energy ("heating") or with UV-light. A mercury lamp from Philips of 500 W emitting in the UV region from 300 to 400 nm can be used to erase these phosphors. After that UV erasure it is recommended tot erase the phosphor also shortly with visible light (halogen lamp).

EXAMPLES

While the present invention will hereinafter be described in connection with preferred embodiments thereof, it will be understood that it is not intended to limit the invention to those embodiments. Following terms used hereinafter will be briefly defined before:

"fluorescence without X-ray irradiation" stands for luminescence upon excitation with UV radiation or visible light without prior exposure of the phosphor with ionisation radiation.

"fluorescence after X-ray exposure" is self explaining as it stands for luminescence after irradiation with X-rays, commonly called "afterglow".

bias stands for a signal generated by the detector prior to excitation of the ionizing radiation, which might be misinterpreted as a signal due to ionization radiation.

PSL: Photostimulated Luminescence afterglow: emission of radiation upon thermal excitation at room temperature of a phosphor that has been exposed to ionizing radiation.

Ce_1: Conversion efficiency of a photostimulated Phosphor expressed as the total amount of light energy per unit area emitted upon stimulation divided by the irradiated X-ray energy (expressed in $pJ/mm^2/mR$)

Ce_2: Conversion efficiency of a photostimulated Phosphor expressed as the total amount of light energy per unit volume emitted upon stimulation divided by the irradiated X-ray energy (expressed in $pJ/mm^3/mR$)

Se: Amount of energy necessary to stimulate 63% of the stored energy in a photostimulable phosphor (expressed in $\mu J/mm^2$)

time decay constant: Fluorescence response time (in ms)

Amp.: The amplitude of the electronic signal generated by the photodetector used in order to measure the emitted light energy.

As is well-known by anyone skilled in the art of digital radiography in order to obtain a reasonable signal-to-noise ratio (S/N) the stimulation light should be prevented from being detected together with the fluorescent light emitted on photostimulation of the storage phosphor. Therefore a suitable filter means is used preventing the stimulation light from entering the detecting means, e.g. a photomultiplier tube.

Because the intensity ratio of the stimulation light is normally markedly higher than that of the stimulated emission light, i.e. differing in intensity in the range of $10^4:1$ to $10^6:1$ (see e.g. EP-A 0 007 105, column 5) a very selective filter should be used. In one embodiment the optical filter is made by colored glass, colored plexiglass, plastics, dyes dissolved in a liquid or in a lacquer, e.g. gelatin, or by a stack of dielectrical layers. So in order to absorb laser radiation having a wavelength of 266 nm a thin plastic layer of e.g. polycarbonate is very suitable. Suitable filter means or combinations of filters were selected therefore from the group consisting of cut-off filters, transmission bandpass filters and band-reject filters (a survey of filter types and spectral transmittance classification has been given e.g. in SPSE Handbook of Photographic Science and Engineering, Edited by Woodlief Thomas, Jr.—A Wiley-Interscience Publication—John Wiley & Sons, New York (1973), p. 264–326). So shortwave pass filters that transmit the shorter wavelengths and reject the longer wavelengths are listed in Table 4.12 of said SPSE Handbook. Bandpass filters that transmit or reject only a limited band of wavelengths are listed in Tables 4.13 and 4.14 respectively. Tables of many selected long-wave, shortwave pass, and bandpass filters, both liquid and solid, for wavelengths from 150 to 3500 nm, are given by W. Summer, Photo Sensors, Chapman & Hall, London, 1957, chap. 9. In U.S. Pat. No. 5,517,034 for example, a narrow bandpass filter SCHOTT BG3 (trade name) is used.

Within the scope of the present invention, in order to provide a useful system, following adaptions were required in order to provide an apparatus for measuring the "stimulation spectrum":

removal of the gelatin filter removal of the lens at the monochromator opening adaption of software(enhanced lower boundary limit to 200 nm) and measurement of the zero base line.

The sample was exposed with a dose of minimum 1 R in order to achieve a signal large enough in order to detect it. Following samples were examined:

Sample No. 1

RbMgF3:Mn: blue colored fluorescence without X-ray exposure orange colored fluorescence with X-ray exposure bias: 180 mV; decay: 75 ms Clear PSL signal Afterglow: orange
  Ce_1=0.29 $pJ/mm^2/mR$
  Ce_2: 0.36 $pJ/mm^3/mR$
  Se=1140–1089 $\mu J/mm^2$ for stimulation at 266 nm Sample No. 2

RbCdF3:0.2% MnF2: green colored fluorescence without X-ray exposure; bias: 4.5 Volt; decay: 75 ms;

clear photostimulable characteristic;

Afterglow: green (very weak)
  $Ce_{13}1$=1.08 $pJ/mm^2/mR$
  Ce_2: 1.36 $pJ/mm^3/mR$
(Ce_1 en Ce_2 will be higher with an adapted optical filter)
  Se=1089 $\mu J/mm^2$ for stimulation at 266 nm Sample No. 3

CsCdF3:MnF2(0.2%): green colored fluorescence without X-ray exposure; bias: 350 mV; decay: 75 ms and 750 ms (2 time constants)

Photostimulation: weak but demonstrable;

Afterglow: green (very strong)
  Ce_1=0.007 $pJ/mm^2/mR$
  Ce_2: 001 $pJ/mm^3/mR$
(Ce_1 en Ce_2 will be higher with an adapted optical filter)
  Se=1344 $\mu J/mm^2$ for stimulation at 266 nm In order to be able to measure a detectable signal the dose was increased up to an exposure amount of 100 R (A=175 mV or 1.75 $\mu V/mR$)

Sample No. 4

CsMgF3:MnF2(0.2%: blue colored fluorescence without X-ray exposure orange colored fluorescence after X-ray exposure Clear PSL signal Afterglow: orange
  Ce_1 and Ce_2 could not be measured as the phosphor was only available in form of powder Sample No. 5

NaMgF3:Mn: orange and rosaceous fluorescence without X-ray exposure orange and rosaceous with X-ray exposure bias: 6 V (very high); decay: 75 ms Photostimulation: not demonstrable No afterglow: orange
  Ce_1 and Ce_2: not measurable as photostimulation could not be demonstrated In order to be useful in this application the ratio of the signal detected by photostimulation to the bias should be as high as possible. As the signal detected upon photostimulation is proportional with the absorbed "X-ray dose" and as the bias is constant, the measurement is less accurate at a lower dose. The equivalent dose of the bias is defined as this dose that should be absorbed by the detector in order to obtain a PSL-signal that has the same amplitude as the bias. For the perovskite phosphor material RbCdF3:0.2%MnF2 this equivalent dose, being about 50 R, is the lowest of the described examples. Therefore this phosphor material RbCdF3:0.2%MnF2 is the most preferred. The other materials are showing a higher equivalent dose of the bias of up to 80 R, but they are nevertheless still very useful.

Note that for RbMgF3:Mn en CsMgF3:MnF2(0.2%) the emitted fluorescent radiation has a color differing before and after X-ray exposure. In order to eliminate the "bias" an optical filter is thus very useful. With respect to sensitivity RbCdF3:0.2%MnF2 is the most suitable phosphor. As very long time constants could be found, it is clear that the phosphors can be expected to be less suitable for digital radiography wherein diagnostic images are required.

Having described in detail preferred embodiments of the current invention, it will now be apparent to those skilled in the art that numerous modifications can be made therein without departing from the scope of the invention as defined in the appending claims.

What is claimed is:

1. A radiography system capable of forming an image of an object or detecting irradiation of said object, said radiography system comprising a sensor having an exposure response function, wherein said sensor is in a form of a stimulable storage phosphor plate, comprising stimulable storage phosphors wherein an energy of stimulation radiation is higher than an energy of emission radiation upon stimulation of said stimulable storage phosphors, wherein said stimulable storage phosphors have a cubic Perovskite structure of the Pm3m space crystallographic group as determined by X-ray powder diffraction using Cu.alpha.1 irradiation and have a structure corresponding with a following formula (Ia–Ih):

| | |
|---|---|
| $RbCdF_3$:Mn | Ia |
| RbMgF:Mn | Ib |
| $CsCdF_3$:Mn | Ic |
| $NaMgF_3$:Mn | Id |
| GdOF:Mn | Ie |
| $GdBaZnO_5$:Eu | If |
| $BiOX:Eu^{3+}$ | Ig | where X is F or Cl

| | |
|---|---|
| $LiMgF_3$:Mn, and | Ih | wherein said stimulable storage phosphors have a dark decay so that within 24 hours in the dark said stimulable storage phosphors will not lose more than 5% of all stored energy.

2. A radiography system according to claim 1, wherein said stimulable storage phosphors are stimulated with radiation having a wavelength that is not within an excitation spectrum of said stimulable storage phosphors and wherein said excitation spectrum is indicative for wavelengths at which the stimulable storage phosphors can be excited while not having been exposed to ionizing radiation.

3. A radiography system according to claim 1, wherein said stimulable storage phosphors are chosen so that no overlap is present between the wavelength spectrum of stimulation and the wavelength spectrum of excitation.

4. A radiography system according to claim 1, wherein said stimulable storage phosphor plate is stimulated at predetermined intervals with stimulating radiation having a wavelength in the ultraviolet wavelength region, and wherein the stimulated emission light is detected by a control means in order to quantify the emitted signal response by the steps of:

reading an amount of the stimulated light and converting said amount into an electric signal value, storing electric signal value(s) obtained at said predetermined intervals and processing said value(s) in order to quantify total amounts of radiation absorbed by said object, comparing said total amount with pre-defined threshold values for obtaining a difference value, and reproducing said difference value on a display.

5. A radiography system according to claim 4, wherein said electric signal value(s) is sent to a central computer for storing said electrical signal value(s), processing said electrical signal value(s) in order to evaluate a total amount of radiation absorbed by said object, and comparing said total amount with a predefined threshold value in order to obtain a difference value and wherein said difference value is sent to a display.

6. A radiography system according to claim 5, wherein, in order to store said difference value, said difference value is sent to a central memory or to an electronic memory chip on a monitoring device.

7. A radiography system according to claim 4, wherein said step of storing electric signal value(s) obtained at said predetermined intervals and processing said value(s) in order to evaluate a total amount of radiation absorbed by said object, and comprising said total amount with a pre-defined threshold value for obtaining a difference value, proceeds in a processor chip on a monitoring device.

* * * * *